O. STODDARD.
Churn.
No. 22,989.
Patented Feb. 15, 1859.
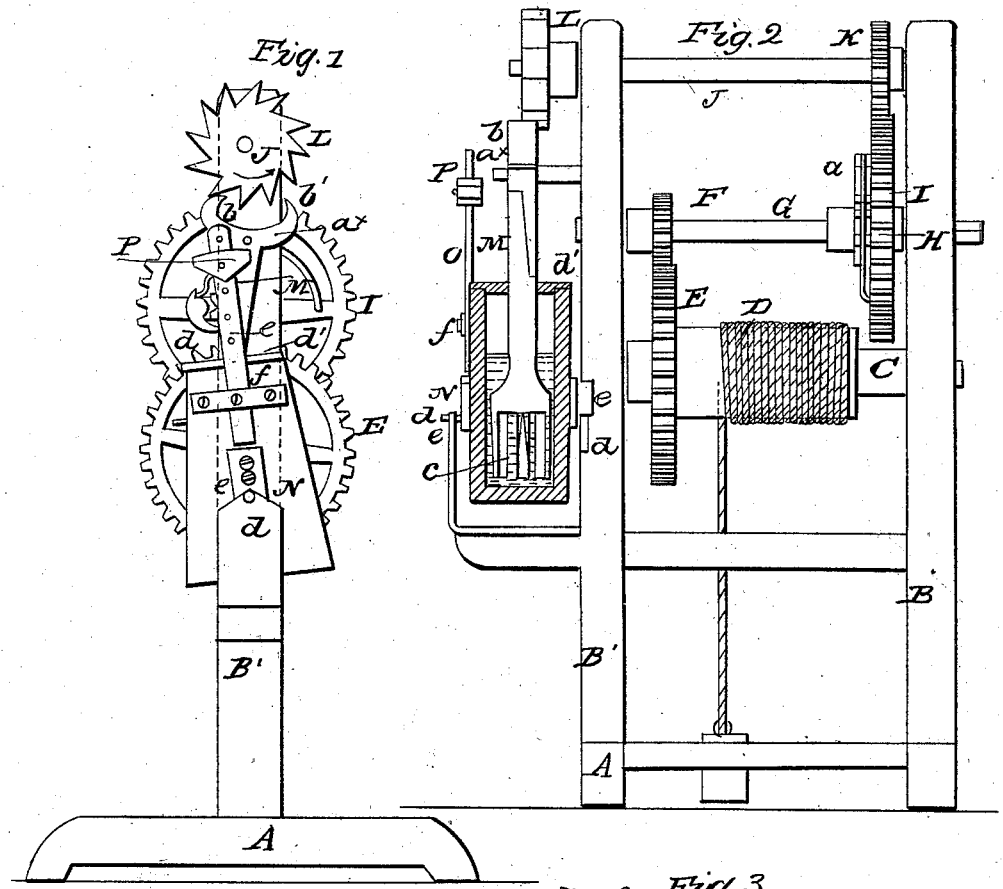

UNITED STATES PATENT OFFICE.

ORREN STODDARD, OF BUSTI, NEW YORK.

CHURN.

Specification of Letters Patent No. 22,989, dated February 15, 1859.

*To all whom it may concern:*

Be it known that I, ORREN STODDARD, of Busti, in the county of Chautauqua and State of New York, have invented a new and Improved Apparatus or Device for Churning Butter; and I do hereby declare that the following is a full, clear, and exact description of the same, reference being had to the annexed drawings, making a part of this specification, in which—

Figure 1, is a front elevation of my invention. Fig. 2 is a side view of do, a portion being in section. Fig. 3, is a detached view of the churn and dasher the former being bisected vertically.

Similar letters of reference indicate corresponding parts in the several figures.

To enable those skilled in the art to fully understand and construct my invention, I will proceed to describe it.

A, represents a horizontal frame or base, to which two uprights B, B', are attached, and C, is a shaft which is placed horizontally between said uprights, said shaft having a drum D, upon it, and a toothed wheel E, at one end. The wheel E, gears into a pinion F, which is placed at one end of a shaft G, said shaft having a ratchet H, attached permanently to it and a toothed wheel I, placed loosely on it. The wheel I, has a pawl $a$, attached to it, which pawl catches into the teeth of the ratchet H, said pawl connecting the wheel I, with the shaft G, when the former is turned in one direction. Between the upper parts of the uprights B, B', a shaft J, is placed. This shaft has a pinion K, on it near one end, and said pinion gears into the wheel I. The opposite end of this shaft extends through its upright B', and has a 'scape wheel L, secured permanently on it.

On the drum D, a rope or chain shown in red, is wound, said rope or chain having a weight attached, which weight is also shown in red.

To the outer side of the upright B', and directly below the 'scape wheel L, a "crutch" M, is placed on a pivot $a^x$. This "crutch" is provided with pallets $b$, $b'$, precisely similar to those of a clock, and acted upon in the same manner by the 'scape wheel L. The lower part of the "crutch" M, is made broader than its upper portion and it is slotted vertically as shown clearly at $c$, in Fig. 2, and forms the "dasher" of the churn.

N, is the churn which may be of pyramidal form. This churn has a pivot or journal $d$, attached to each side of it, said journals working in bearings $e$, attached to the upright B'. The "crutch" M, passes through the cover $d'$, of the churn, the bearing of the "crutch" upon or against the churn being at this point.

To the outer side of the churn N, a guide $f$, is attached, and in this guide a bar O, is placed, said bar having a weight P, placed loosely on it and which may be adjusted higher or lower as desired. The lower end of the "crutch" M, extends down nearly to the bottom of the churn N, as shown clearly in Figs. 2 and 3.

The operation is as follows:—The rope or chain is wound up on the drum D, and as it descends by its gravity rotates the 'scape wheel L, through the medium of the gearing E, F, H, I, K. The 'scape wheel L, vibrates the "crutch" M, which oscillates the churn N, and subjects the cream to the necessary agitation to produce butter within the usual time. It will be seen that the "crutch" M, by its action on the churn prevents the cream within from following the motion of the churn, or in other words, prevents the cream from oscillating in unison with the churn. The cream therefore will be properly agitated. By adjusting the weight P, higher or lower on the bar O, the speed of the churn may be regulated as desired. The higher the weight P, is adjusted on the bar O, the slower the movement or oscillations of the churn will be, and the lower the weight P, is adjusted on the bar the quicker will be the speed.

This invention has been practically tested and it operates remarkably well. A weight of about 450 lbs., having a fall of 15 feet will operate a churn of medium capacity from 45 to 60 minutes. The device may be constructed at a moderate expense and the labor saved by its use will compensate in a very short space of time for its cost.

I do not claim broadly the employment or use of a weight in connection with the gearing, 'scape wheel and pallets applied to a churn for operating the same irrespective of the particular manner of adapting the power to the churn as herein shown and described, for such parts form a portion of a simple clock movement and is a well known device; but,

Having thus described my invention, what I do claim as new and desire to secure by Letters Patent, is—

The combination of the crutch M, with the interior of the churn box N, so that the lower end of said crutch shall act as and constitute the dasher, substantially as described.

ORREN STODDARD.

Witnesses:
 WM. TUSCH,
 W. HAUFF.